United States Patent
Sunder Rajan et al.

(10) Patent No.: US 9,155,088 B2
(45) Date of Patent: Oct. 6, 2015

(54) DELIVERY EDGE PROFILE AGGREGATION

(75) Inventors: Ashok Sunder Rajan, Burnaby (CA); Puneet K. Jain, Hillsboro, OR (US)

(73) Assignee: INTEL CORPORATION, Santa Clara, CA (US)

(*) Notice: Subject to any disclaimer, the term of this patent is extended or adjusted under 35 U.S.C. 154(b) by 400 days.

(21) Appl. No.: 12/975,724

(22) Filed: Dec. 22, 2010

(65) Prior Publication Data
US 2011/0268025 A1 Nov. 3, 2011

Related U.S. Application Data

(60) Provisional application No. 61/330,837, filed on May 3, 2010.

(51) Int. Cl.
- *H04L 12/56* (2006.01)
- *H04W 40/00* (2009.01)
- *H04W 72/04* (2009.01)
- *H04L 5/00* (2006.01)

(Continued)

(52) U.S. Cl.
CPC .......... *H04W 72/042* (2013.01); *H04L 5/001* (2013.01); *H04L 5/003* (2013.01); *H04L 5/0032* (2013.01); *H04L 5/0053* (2013.01); *H04L 5/0064* (2013.01); *H04L 5/0094* (2013.01); *H04L 47/11* (2013.01); *H04L 47/14* (2013.01); *H04L 47/283* (2013.01); *H04L 47/30* (2013.01); *H04W 28/12* (2013.01); *H04W 72/0406* (2013.01); *H04W 36/22* (2013.01); *H04W 72/0486* (2013.01); *Y02B 60/43* (2013.01)

(58) Field of Classification Search
CPC ..... H04M 3/42; H04M 3/42136; H04W 8/18; H04W 8/183; H04W 8/186; H04W 8/205; H04W 8/20
USPC ........................................................ 370/328
See application file for complete search history.

(56) References Cited

U.S. PATENT DOCUMENTS

| | | |
|---|---|---|
| 2004/0266424 A1 | 12/2004 | Park et al. |
| 2005/0164704 A1 | 7/2005 | Winsor |

(Continued)

FOREIGN PATENT DOCUMENTS

| | | |
|---|---|---|
| CN | 1578306 A1 | 2/2005 |
| EP | 1761087 A1 | 3/2007 |

OTHER PUBLICATIONS

Internet Protocol (IP), Internetworking Technology Overview, Jun. 1999.*

(Continued)

*Primary Examiner* — Omar Ghowrwal
*Assistant Examiner* — Ellen A Kirillova
(74) *Attorney, Agent, or Firm* — Thorpe North & Western LLP

(57) ABSTRACT

A system and method for aggregating subscriber information at a delivery edge is disclosed. The method comprises interfacing a user profile aggregation device (UPAD) at a subscriber location with at least one subscriber database in each of a wired network core and a wireless network core. The wired network core and the wireless network core are operated by a Multi-System network Operator. Profile information can be aggregated at the UPAD about the subscriber from at least one database in the wired network core and the wireless network core. The subscriber's aggregated profile information can be communicated to the MSO.

20 Claims, 7 Drawing Sheets

(51) Int. Cl.
*H04L 12/801* (2013.01)
*H04L 12/841* (2013.01)
*H04L 12/835* (2013.01)
*H04W 28/12* (2009.01)
*H04W 36/22* (2009.01)

(56) References Cited

U.S. PATENT DOCUMENTS

| | | | |
|---|---|---|---|
| 2007/0180468 A1* | 8/2007 | Gill et al. | 725/45 |
| 2008/0077462 A1 | 3/2008 | Patel et al. | |
| 2008/0275893 A1 | 11/2008 | Bodin et al. | |
| 2009/0063559 A1* | 3/2009 | Rhodes et al. | 707/104.1 |
| 2010/0226347 A1* | 9/2010 | Caldwell et al. | 370/338 |
| 2010/0239025 A1* | 9/2010 | Veljkovic et al. | 375/240.25 |

OTHER PUBLICATIONS

Lightweight Directory Access Protocol (LDAP), J. Sermersheim, Network Working Group, Jun. 2006.*

Using the Simple Object Access Protocol (SOAP) in Blocks Extensible Exchange Protocol (BEEP), E. O'Tuathail, Network Working Group, Jun. 2002.*

Security Considerations for Voice Over IP Systems, D. Richard Kuhn et al., NIST, Special Publication 800-58, Jan. 2005.*

Office Action received for Korean Patent Application 10-2011-0041697, mailed on Oct. 31, 2012, 8 pages of Office Action including 4 pages of English translation.

Extended European Search Report received for European Patent Application No. 11164606.3, mailed on Aug. 19, 2011, 8 pages.

Office Action received for European Patent Application No. 11164606.3, mailed Jul. 30, 2013. 7 pages.

Office Action received for Chinese Patent Application No. 201110122853.9, mailed on Jul. 6, 2013. 28 pages.

Office Action received for Chinese Patent Application No. 201110122853.9, mailed on Feb. 8, 2014, 3 pages of English Translation and 11 pages of Chinese Office Action.

* cited by examiner

| | | Core Network Subscriber Database & Profile Abstraction | | | | | | | |
|---|---|---|---|---|---|---|---|---|---|
| | | Databases | | | | | | | |
| Sr. No | Profile Abstraction | Subscriber Database | Service Plan | Service Profile | User Preferences | MS Registration | Network Capability | MS Capability | Location |
| 1 | Home Demographic | X | | | | | | | |
| 2 | Social Demographic | X | | | | | | | |
| 3 | Economic Demographic | X | X | X | | | | | |
| 4 | Online Service Demographic | | | X | | | | | |
| 5 | User personal preferences & Demographic | | X | X | X | | | | |
| 6 | Device Demographic | X | | | | X | | | |
| 7 | Mobility Demographic | | | | | X | | | X |
| 8 | Network Capability | | | | | | X | | |
| 9 | MS Capability | | | | | | | X | |
| 10 | Location | | | | | | | | X |

FIG. 2

| UPAD Data Visibility |||||
| --- | --- | --- | --- | --- |
| External Facing || Internal Facing |||
| MSO Wired/Wireless Core Network | Web Service Applications | Content/Service Consumed | Consumption Behavior | Consumption Ambience |
| User home service provider | Home demographic profiling service apps | Movies, entertainment channels viewed | User Mobility- Metro warrior, road warrior | Other devices on which services are being consumed- concurrent or time shifted |
| User service subscription information | Economic profile profiling service apps | Chat, VOIP, IM, e-mail data usages | Personal preferences and privacy | Number of such devices connected and receiving service at any given time |
| | Service avidity profiling service apps | | Other non-service applications running when service is being consumed | |

FIG. 4

DELIVERY EDGE PROFILE AGGREGATION

CLAIM OF PRIORITY

Priority of U.S. Provisional patent application Ser. No. 61/330,837 filed on May 3, 2010 is claimed, which is herein incorporated by reference.

BACKGROUND

Multi-System network Operators (MSO) such as AT&T and Verizon offer comprehensive wired and wireless connectivity service packages to users. Their service bundles typically include wired services comprising a Voice over Internet Protocol (VOIP) or Digital Subscriber Line (DSL) connection for a home phone line and internet connection as well as television offerings provided through a cable or satellite connection. They often also bundle a wireless plan for wireless communication for voice and data through a wireless network. The bundled services are typically packaged to present attractive options to different target subscriber groups.

The challenge for MSOs in providing bundled services is one of revenue sustenance. MSOs are often compelled to continually expand the number of services that are offered for a fixed price to grow the number of subscribers. In order to increase revenue, MSOs look for ways to add value to their connectivity services to increase their share of the market.

One way to add value is to provide service customization and loyalty programs for customers. These programs can be most effective when the MSO has a good understanding of each client. However, MSOs are often not able to deploy data mining technologies that enable them to gain a good understanding of their clients since all of the information is not located in a single repository for the different services provided in a user's bundle. MSO subscriber information is often spread across different elements on the network in multiple core network domains. While each domain has a view of the subscriber that is specific to its function on the network, such as billing, network access, and so forth, the disparate information makes it difficult to obtain a complete picture of a user.

Building out a common meta-repository that presents a homogenous view of subscribers across the different connectivity services offered is a multiyear effort that MSOs have been working on. This effort is complicated by the fact that there are multitudes of equipment vendors with differing interface protocols combined with the upgrade costs of legacy infrastructures. MSO initiatives are underway at standards organizations such as the $3^{rd}$ Generation Partnership Project (3GPP) to address requirements for a homogenous user data repository (UDR).

Despite the MSO's efforts to address the fragmentation of data, it is evident that it will take several years before the MSO's various network cores can evolve to provide the desired level of inter-connectivity needed to gain a desired understanding of a subscriber of bundled services.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein:

FIG. 2 is a table illustrating examples of subscriber profile abstractions generated from subscriber databases in accordance with an embodiment of the present invention;

FIG. 4 is a table providing examples of data visibility in accordance with an embodiment of the present invention;

Figure 1:
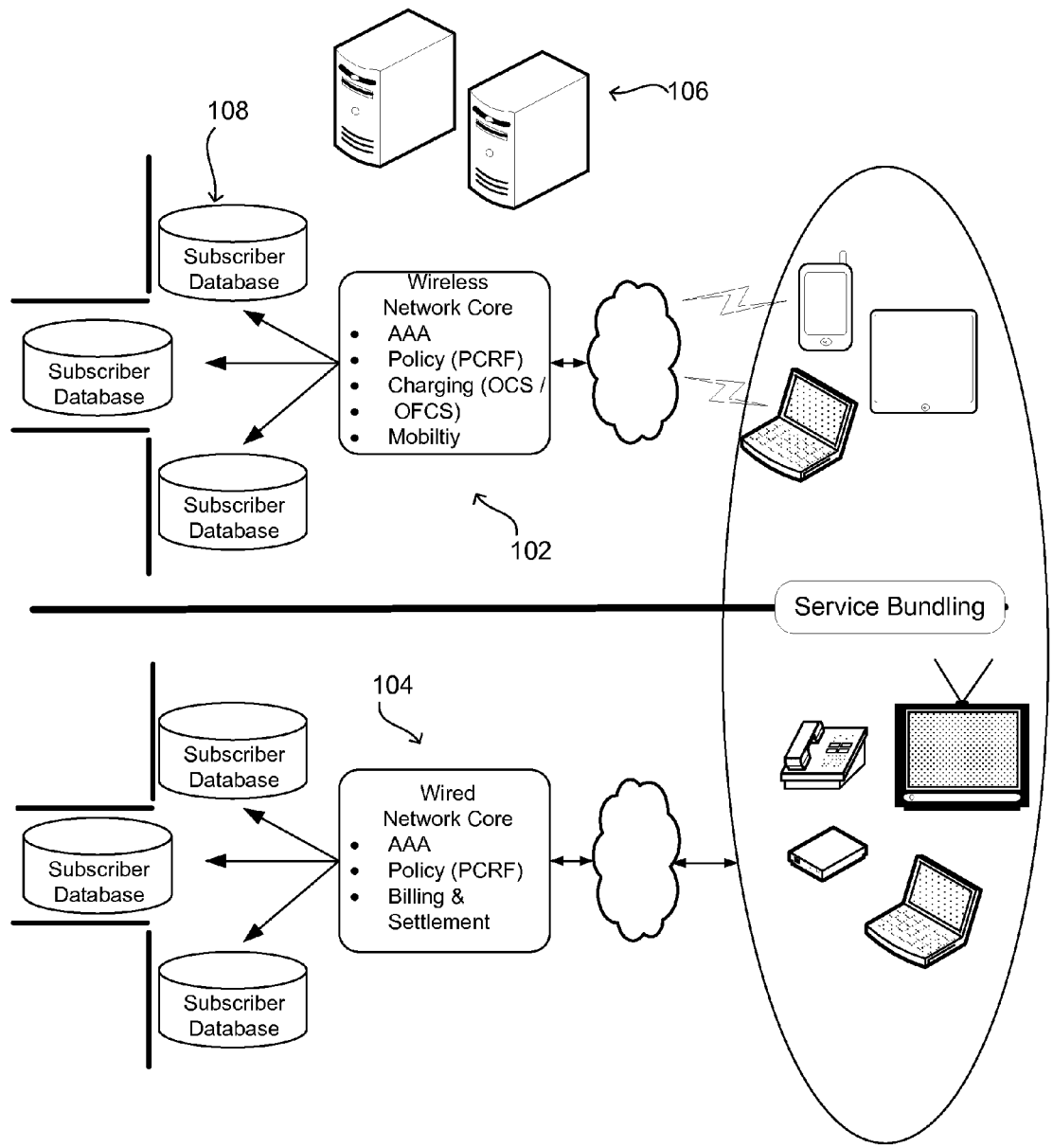
FIG. 1 illustrates a block diagram of an example of user data profile fragmentation that is caused by network data silos used by a Multi-System network Operator (MSO)

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular embodiments only and is not intended to be limiting.

DEFINITIONS

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

Example Embodiments

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter. The following definitions are provided for clarity of the overview and embodiments described below.

A Multi-System network Operator (MSO) can provide comprehensive wired and wireless connectivity service packages to subscribers. The service bundles typically include wired services comprising a Voice over Internet Protocol (VOIP) or Digital Subscriber Line (DSL) connection for a home phone line and internet connection as well as television offerings provided through a cable, fiber optic, or satellite connection. The MSO often also bundles a wireless plan for wireless communication for voice and data through a wireless network. The wireless plan has traditionally provided wireless voice access. However, a broad range of devices including laptop computers, tablet computers, hand held computing devices, and smart phones now use data connections to provide email, internet connectivity, and audiovisual entertainment such as digital television.

The bundled services are typically packaged to present attractive options to different target subscriber groups. In order to continue to increase in market share, the MSO often adds more and more services to a bundled service, while often maintaining the same price. This can drive down the MSO's profits over an extended period.

One way to add value is to provide service customization and loyalty programs for customers. These programs can be most effective when the MSO has a good understanding of each client. However, MSOs are often not able to deploy data mining technologies that enable them to gain a good understanding of their clients since all of the information is not located in a single repository for the different services provided in a user's bundle. MSO subscriber information is often spread across different elements on the network in multiple core network domains. While each domain has a view of the subscriber that is specific to its function on the network, such as billing, network access, and so forth, the disparate information makes it difficult to obtain a complete picture of a user at the MSO.

The broad array of different services provided in a typical bundle results in different equipment used in each different service that is provided by a multitude of different equipment vendors with differing interface protocols. Building out a common meta-repository that presents a homogenous view of subscribers across the different connectivity services offered is a multi-year effort that MSOs have been working on. The challenges of creating interoperable standards combined with the costs of upgrading legacy infrastructures means that it is likely that it will be several years before the systems will be in place to address the data fragmentation at the MSO.

FIG. 1 provides one example illustration of user data profile fragmentation that is caused by network data silos used by an MSO. The MSO may operate a wireless network core 102, a wired network core 104, and provide web services 106. Each of these core entities can include a plurality of databases 108. However, the databases and information collection techniques from the databases are often non-interoperable with databases in other cores. Moreover, the databases within each core can even be non-interoperable with other databases within the core. The result is an inability of the MSO to collect information to provide a full picture of each subscriber.

While the databases and core networks operated by an MSO may be separated and non-interoperable at the MSO, there is one location where substantially all of the services offered by the MSO are available. At the service delivery edge, a device can be configured to communicate to and interoperate with the various databases in the multiple cores. The service delivery edge, located at or near the subscriber's residence, building, or place of business, is a location where each service offered by the MSO is actively received. A delivery edge profile aggregation system can be configured to communicate with the desired databases in the MSO's different network cores, thereby enabling the desired information to be collected.

In addition, the delivery edge profile aggregation system can be configured to provide information from one network core to another network core, thereby enabling communication between the network cores about a selected subscriber. The ability to transfer information between the network cores can significantly enhance the services provided by the MSO to a subscriber.

In accordance with one embodiment of the present invention, a delivery edge profile aggregation system is disclosed. Use of the delivery edge profile aggregation system can overcome the data fragmentation caused by the lack of interoperable standards in the wide array of different types of equipment used to provide bundled services such as wired telephony, cable or satellite television, wired internet services, and wireless connectivity for devices such as cell phones, laptops, and mobile computing devices. Additional devices such as embedded computers in vehicles and appliances can also be integrated with the delivery edge profile aggregation system. Since the system is located at the delivery edge, the system can have both an external facing view of the MSO's wired and wireless core networks and web service applications, as well as an internal facing view of the consumer's electronic devices, content, consumption behavior, and consumption ambience.

The ability to obtain both an external facing view and an internal facing view enables the edge profile aggregation system to build a more complete profile of a user (consumer) for the MSO. The profile can then be used by the MSO to add value to their connectivity services by providing their customers with service customization and loyalty programs based on a more complete picture of the consumer's uses of the bundled services as well as the consumer's behavior and consumption history. This information can be obtained from the delivery edge profile aggregation system.

The delivery edge profile aggregation system can be used to collect such information for thousands of users of bundled systems. This enables the MSO to deploy data mining technologies for subscriber information that is typically spread across several different elements of the MSO's network. By aggregating the information from a large composite of users, the MSO can obtain knowledge of subscribers' typical behaviors. The collected information can then be analyzed to determine potentially underserved subscribers.

Using the information provided from the delivery edge profile aggregation system, an MSO can add value by offering service customization and loyalty programs to their subscribers. For instance, the MSO may make buy suggestions to a customer based on what other users of "similar preferences" are buying. The MSO may also offer loyalty programs such as business class travel that is attached to "spend thresholds". The service customization and loyalty programs can provide an MSO with the ability to maintain their client base in a very competitive environment.

FIG. 2 provides table illustrating the challenge in obtaining information about a user's profile. The table 200 provides an example of databases and possible profile abstractions that can be elicited from such databases. The column headers 202 of the table list various databases that may exist for a subscriber of an MSO's bundled service. The databases may be located on one or more different servers. The servers may be located in the same network core or different network cores. The databases listed are for example purposes. Additional information may be obtained from different databases used by an MSO.

A number of profile abstractions 204, listed in rows, can be obtained from information in the databases 202. The table shows which databases can be used to gather information for selected profile abstractions. For instance, the customer's home demographic can be obtained from information in a subscriber database. The home demographic is the home location of the subscriber. A social demographic can also be obtained from the subscriber database. The social demographic is derived from the number of family members on the subscriber's wireless phone plan. The social demographic can also include information about the subscriber's list of friends and contacts. For instance, an MSO may have a policy that allows a subscriber to talk with selected friends and family at a reduced or free rate. This list can be used to compile a social demographic.

An economic demographic can be derived from information in the subscriber database, service plan and service profile. The economic demographic can be derived from the number of services subscribed to, the type of service plan, the monthly bills of the subscriber, and so forth.

An online service demographic can be compiled from information in the service profile database. The information can be derived from the number of services that are subscribed to, the number of services that are subscribed at a given time, and so forth.

A user personal preferences demographic can be constructed from information contained in an MSO's service plan database, service profile database, and user preferences database. The personal preferences demographic can be derived from the number of services subscribed to, the service plan, and the number of services active at a given time. This information can be used to describe the personal traits of the user.

A device demographic can be obtained from information in the subscriber database and a mobile station registration database. The device demographic is derived from the number of devices that are registered by the user. This information can be used to determine whether the subscriber is device savvy. For instance, information can be obtained regarding the frequency of hardware updates performed by a subscriber, such as performing a cell phone update every 6 months or once every 3 years. A subscriber that updates more frequently can be provided with more information regarding state of the art cell phones. A subscriber that does not upgrade frequently may receive less information.

A mobility demographic can be constructed from information available in the MSO's mobile station registration database and a subscriber location database. The mobility demographic information can be derived from the subscriber's frequency of location updates. This information can be used to determine the subscriber's frequency of travel. This information may be used to offer different services based on the frequency of travel and locations of travel.

The demographics listed in the preceding paragraphs are provided as examples only and are not intended to be limiting. Other types of demographic information can be obtained as well from the various subscriber databases available in the different cores at the MSO.

Figure 3:
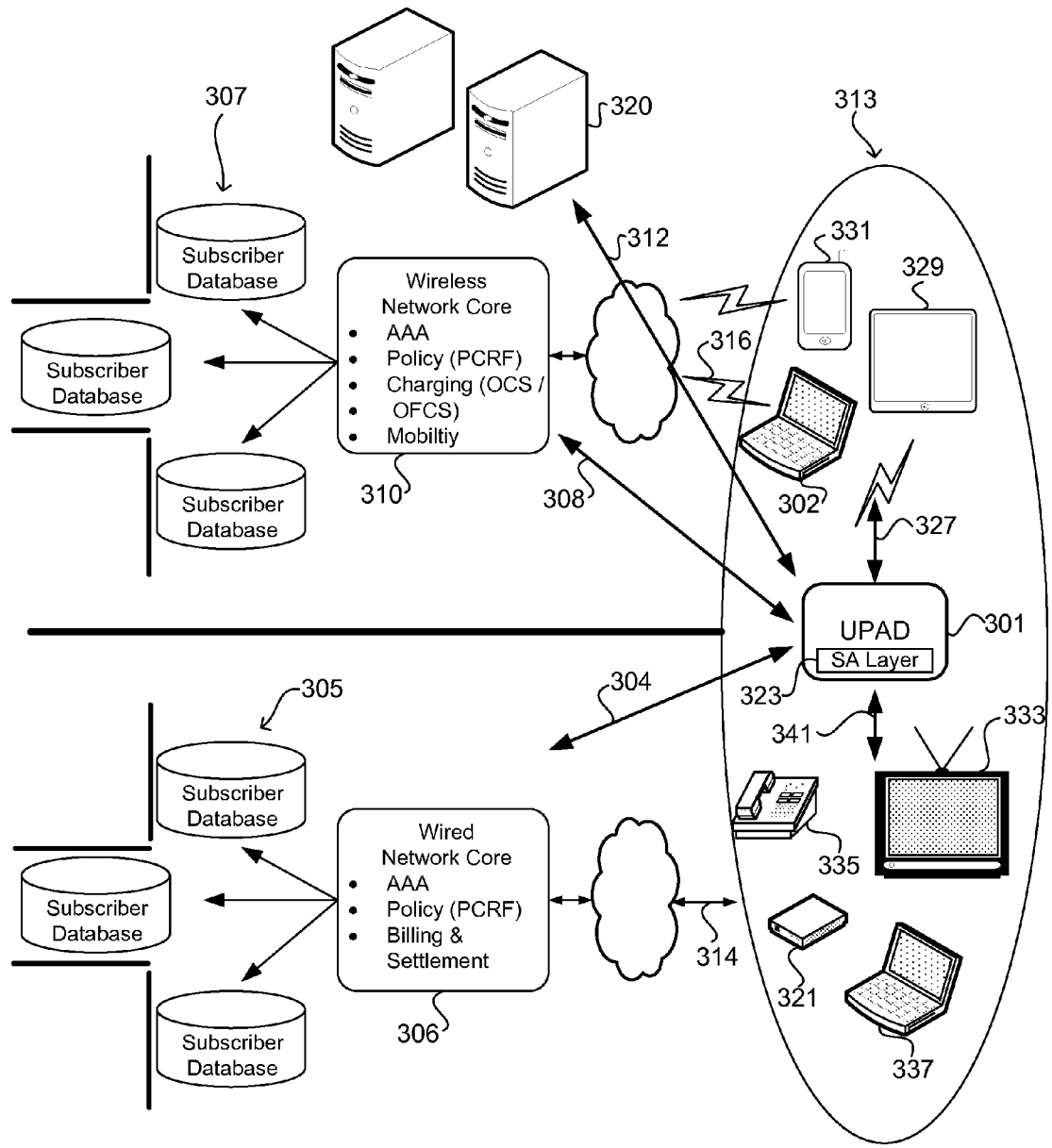
FIG. 3 illustrates a block diagram of a delivery edge aggregation system in accordance with an embodiment of the present invention.

FIG. 3 illustrates an example delivery edge aggregation system 300 in accordance with one embodiment of the present invention. The system can comprise a user profile aggregation device (UPAD) 301 that is configured to receive wired, wireless, and web services from a multi-system network operator (MSO) that is operable to deliver a service bundle of wired and wireless services to a subscriber.

The wired and wireless services offered in a service bundle are affiliated with the MSO. In one embodiment, the MSO may be solely owned and controlled by the MSO. Alternatively, the wired and wireless services may be contracted by the MSO and owned by separate companies. For instance, the MSO may offer a satellite television subscription provided by a satellite television company, an internet connection provided by an internet company, and wireless services provided by a separate wireless services provider.

The UPAD can comprise any type of device that is capable of communicating with the wired 304, wireless 308, and web 312 services offered by the MSO. The wired, wireless, and web services can be referred to as W3 services. For instance, the UPAD may be a laptop 302 that can communicate with subscriber databases 305 in the MSO's wired network core 306 via a wired connection 314, such as through a wired Ethernet connection to the wired network core of the MSO. Alternatively, the wired connection can include a short range wireless connection (not shown) such as an Institute of Electronics and Electrical Engineers (IEEE) 802.11 wireless connection to a modem 321 that is then connected to the wired core 306 of the MSO through a wired connection 314. Other types of short range communications standards, such as Zigbee®, Bluetooth®, Ultra Wideband (UWB), and so forth may be used to connect with the wired network core as well. The UPAD may also be hosted within a modem, a residential gateway, or another type of electronic device located at the delivery edge that is capable of communicating with the wired, wireless, and web services offered by the MSO.

The wired network core 306 can include databases such as the Authentication, Authorization and Accounting (AAA) database on a server such as an AAA server. As denoted by the database title, this database can be used in authenticating a subscriber through an authentication process such as password control. The server can provide the means for authorization of a subscriber onto the MSO's wired network core. Authorization can be determined based on selected restrictions. For example time of day restrictions, physical location restrictions, or restrictions against multiple access by the same entity user may be provided.

The wired network core 306 can also provide databases used in accounting. The accounting database can be used to track the subscriber's accesses to the wired network core 306. For instance, the subscriber's identity, the type of service delivered, the start and stop time of the service's delivery can be recorded in the accounting database in the wired core. Data from this database can be used for management, planning, billing, and so forth.

The wired network core 306 can also include one or more databases operating on a policy server. The policy server, such as a Policy Charging and Rules Function (PCRF) server is a node that can be configured to designate in real-time to determine policy rules in a multimedia network. The PCRF server can aggregate information to and from the wired network core, operational support systems, and other sources within the wired network core (such as portals). The information may be aggregated in real time, thereby supporting the creation of rules and then automatically making intelligent policy decisions for each subscriber that is active on the network. For instance, the PCRF server can configure the subscriber for on-demand services for television or internet. When a subscriber wants to order a show, or selects a desired television channel, a database on the PCRF server can determine whether the subscriber is authorized to view the selected channel in real-time.

The wired network core 306 can also include a billing and settlement database. The billing and settlement can be configured to work with the AAA server and PCRF server to bill a subscriber based on the subscriber's uses of the MSO's services in the wired network core. For instance, if a pay-per-view movie is ordered, the PCRF server can communicate the cost of the movie to the billing and settlement database to enable the subscriber to be charged.

The wireless network core 310 has similarly named servers and databases, including the AAA server, the PCRF server, and a mobility server configured to track a subscriber's wireless mobility between base stations. The servers and databases in the wireless network core are typically not configured to communicate with the servers and databases in the wired network core 306. For instance, the PCRF server in the wireless network core can include information such as which base stations a mobile station (user equipment) can access, the bandwidth that the mobile station can access, the quality of service, and so forth. In contrast, in the wired network core, there are no base stations and bandwidth may be more fixed than in a wireless network. Thus, the differences between the information contained in the databases in the wireless network core and the wired network core often proscribe the databases in the wired and wireless cores from communicating.

The UPAD 301 can also be configured to connect 308 with the wireless network core 310 via a wired or wireless connection 316. The wireless connection can be established using a wireless standard such as the IEEE 802.16 standard, the third generation partnership project (3GPP) standard, or another wireless standard that is operable to enable the UPAD to communicate with the W3 services.

The connection 308 between the wired network core and the UPAD 301 and the connection 304 between the UPAD and the wireless network core can be configured to provide a trusted interface that enables the UPAD to access the various networks that have been discussed in each network core to aggregate information from each network core.

For instance the connections 304, 308 may be formed using level three (L3) interfaces based on protocols such as the Lightweight Directory Access Protocol (LDAP) or Simple Object Access Protocol (SOAP). LDAP is an application protocol for querying and modifying data of directory services implemented in networks such as Internet Protocol (IP) networks. Similarly, SOAP is a protocol specification for exchanging structured information in the implementation of Web Services in computer networks. A markup language such as the eXtensible Markup Language (XML) can be used in SOAP for message negotiation and transmission.

The UPAD 301 can include a services abstraction layer 323 to implement multiple interfaces to provide a unified decision point to a policy engine. The services abstraction layer can form a layer above the level three interfaces used to connect the UPAD with the W3 services 304, 308, 312. The services abstraction layer enables the UPAD to collect desired information from each of the multiple network cores in communication with the bundled services 313. In addition, the services abstraction layer enables information from a database in one network core to be communicated to a database in a separate network core. For instance, information from a PCRF database in the wired network 306 core can be communicated to a PCRF database in the wireless network core 310 through the services abstraction layer 323 in the UPAD 301. This will be discussed more fully below.

The layer three interfaces enable the UPAD 301 to provide external facing data visibility with the databases in the MSO's wired 306 and wireless 310 core networks. In addition, the UPAD can also provide internal data visibility with various subscriber devices that are in communication with the MSO through the W3 services 304, 308, 312. For instance, the UPAD can be configured to have wireless device communication 327 with various wireless devices, such as a laptop 302, a tablet computer 329, a smart phone 331, and so forth. The UPAD can also be configured to have wired device communication 341 with wired devices that are connected with the MSO's services, such as a television 333, a wired telephone 335, a laptop 337, a modem or residential gateway 321, and so forth. The UPAD may communicate with the wired devices through wireless connections such as an IEEE 802.11 wireless connection or another type of short range wireless connection, as previously discussed. In another embodiment, the UPAD may communicate with a selected server in a network core of the MSO that is in communication with a desired consumer device. The server at the network core can then forward the communication on to the wired or wireless device used by the consumer.

The table in FIG. 4 provides a summary of example information that the UPAD can obtain through external and internal facing data visibility. For instance, the UPAD can obtain information about the subscriber's home service provider and service subscription information from the core networks at the MSO. Interfacing with the web service applications 320 (FIG. 3) can provide home demographic profiling service applications, economic profiling service applications, and service activity profiling service applications.

Internal facing data availability enables the UPAD to determine what content or services are being consumed, such as what movies are watched, the entertainment channels that are viewed, and the services used such as chat, voice over internet protocol (VOIP) telephony, instant messaging, email, data usage, and so forth.

Internal facing data availability also provides information about the subscriber's consumption behavior. For instance, the amount and distance that the subscriber travels can be determined by the location of use of the subscriber's wireless phone. The user's personal preferences and privacy settings can be determined from the use of internet, television, and wireless phone. Other types of non-service applications that are running when service is being consumed can also be determined. For instance, applications that are running on a device such as email or a chat client that are not provided by the MSO can be determined.

Internal facing data availability can be used to determine information regarding the subscriber's consumption ambience. One example of consumption ambience is a determination as to what types of devices the subscriber consumes services on. For instance, does the subscriber typically watch television programming on the subscriber's television, wired internet connection, or through a wireless service such as on a tablet computer. A determination can also be made as to whether the subscriber watches television shows in real time, or time-shifted through the use of a digital video recorder (DVR). Another example of the subscriber's consumption ambience is the number of devices that are connected and receiving service at a given time.

Figure 5:
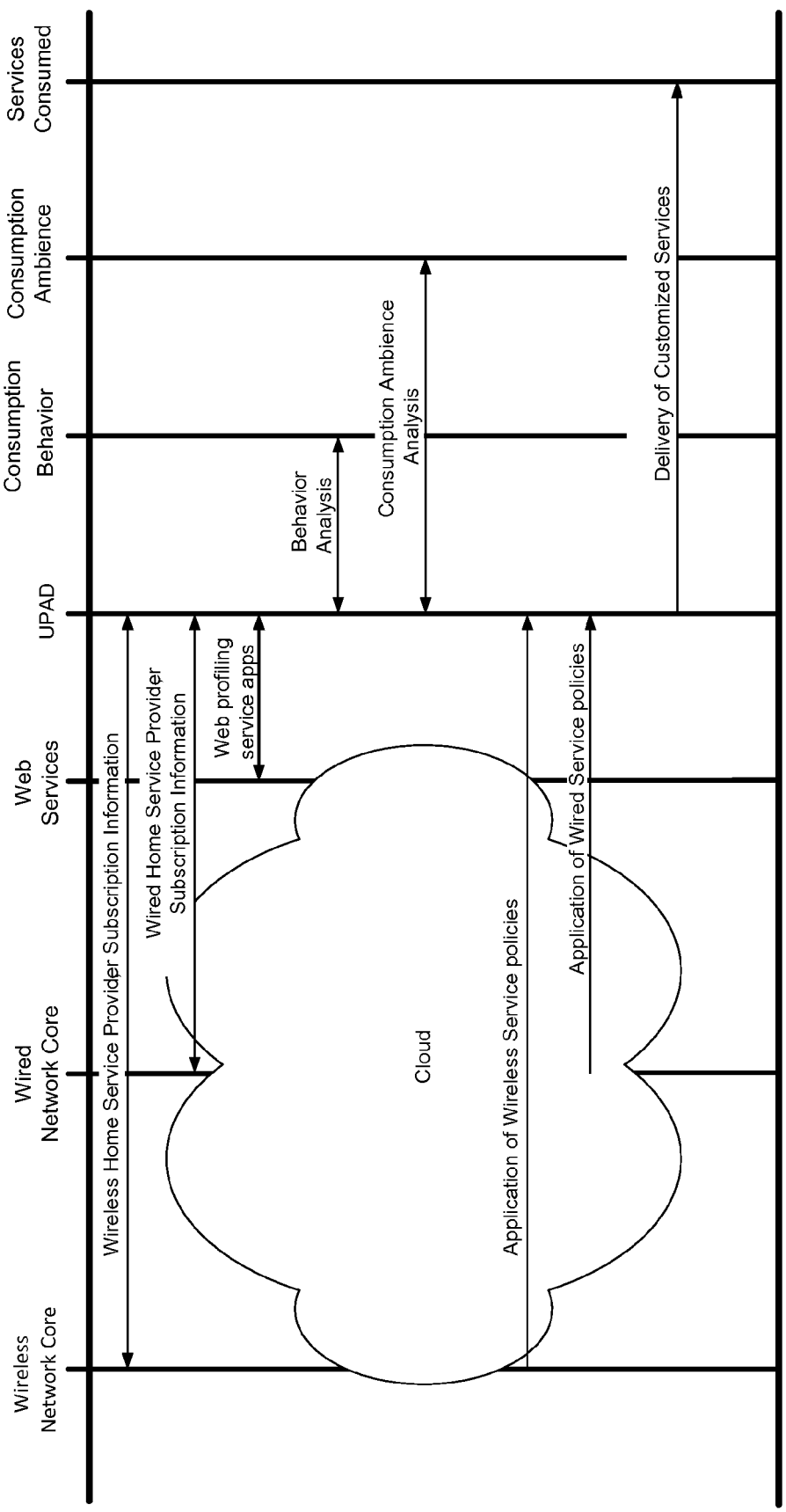
FIG. 5 is an example illustration of a customized service delivery process using the delivery edge profile aggregation system in accordance with an embodiment of the present invention.

FIG. 5 provides an example illustration of a customized service delivery process using the delivery edge profile aggregation system. The UPAD is located at the delivery edge at a subscriber's location. The subscriber's location may be a place of residence such as a house, condominium, or apartment, or it may be a building such as an office building or factory. In FIG. 5, the left of the UPAD is represented as external facing data visibility and the right of the UPAD is represented as internal facing data visibility.

The UPAD can communicate with a wireless service provider's wireless network core to obtain information regarding the subscriber's subscription information. Similarly, the UPAD can communicate with a wired service provider to obtain subscription information for a subscriber. Web services can be used to provide web profiling service applications for the UPAD, as discussed above with respect to FIG. 4. The application of wireless service policies and wired service policies can also be obtained at the UPAD from the wireless and wired service provider(s), respectively.

Internal facing data visibility at the UPAD includes the ability to obtain behavior analysis based on the subscriber's consumption behavior and consumption ambience analysis based on the subscriber's consumption behavior, as previously discussed.

Using the information available, the UPAD can then be used to enable the MSO to deliver customized services to the subscriber. By gaining a more detailed and accurate understanding of each subscriber, the MSO can aggregate information from hundreds and thousands of subscribers. The aggregated data can be used to generate predictive models that can be used to offer a subscriber customized services based on how the subscriber's aggregate profile information and aggregate consumption information compares with the predictive models. For instance, a subscriber may order a sports channels package for his or her television. The UPAD can enable the MSO to have a better understanding of the subscriber, including information such as that the subscriber has a wireless television subscription for his or her tablet computer through the MSO. The subscriber can be offered a similar sports package for the wireless television on his or her tablet or other mobile computing device for an additional amount, such as $5.00.

Moreover, knowledge aggregation at the UPAD can enable the MSO to provide synergism through the combination of services. In other words, a subscriber can obtain better services and better value by using an MSO rather than purchasing selected services a la carte. For instance, a subscriber may watch football games of his local college on his television connected to the MSO's wired service provider. One week, the subscriber may miss the football game. A database in the wired network core can be used to determine that the football game is not being watched, as is typically done. The UPAD can obtain information from the wired network core using the service abstraction layer to identify that the subscriber is missing the game. The UPAD can be configured to proactively send a message to the subscriber, offering to let the subscriber watch the football game on his portable computing device, such as a tablet computer. Alternatively, the UPAD may communicate with a television set top box and instruct it to record the football game to a digital video recorder, and send a message to the subscriber that allows the subscriber to determine whether to keep the recording on the digital video recorder.

In another embodiment, the subscriber may sign up for a premium television package that allows the subscriber to watch multiple premium movie channels. The UPAD can obtain this information from the wired network core. The UPAD can then communicate this information to the wireless network core. The subscriber can then automatically receive the same channels on his or her portable computing device via a wireless service provided by the wireless service provider. The ability of the subscriber to create settings for one device, and have those settings transferred automatically to other devices can provide significant benefits to the subscriber. The added benefits of obtaining the bundled services from the MSO, rather than purchasing them from multiple vendors, can make the MSO's services more valuable to their customers. This can enable the MSO to charge higher prices than a la carte vendors, since they offer better services that saves the subscriber time and money and makes it more convenient for the subscriber to use the MSO.

Figure 6:
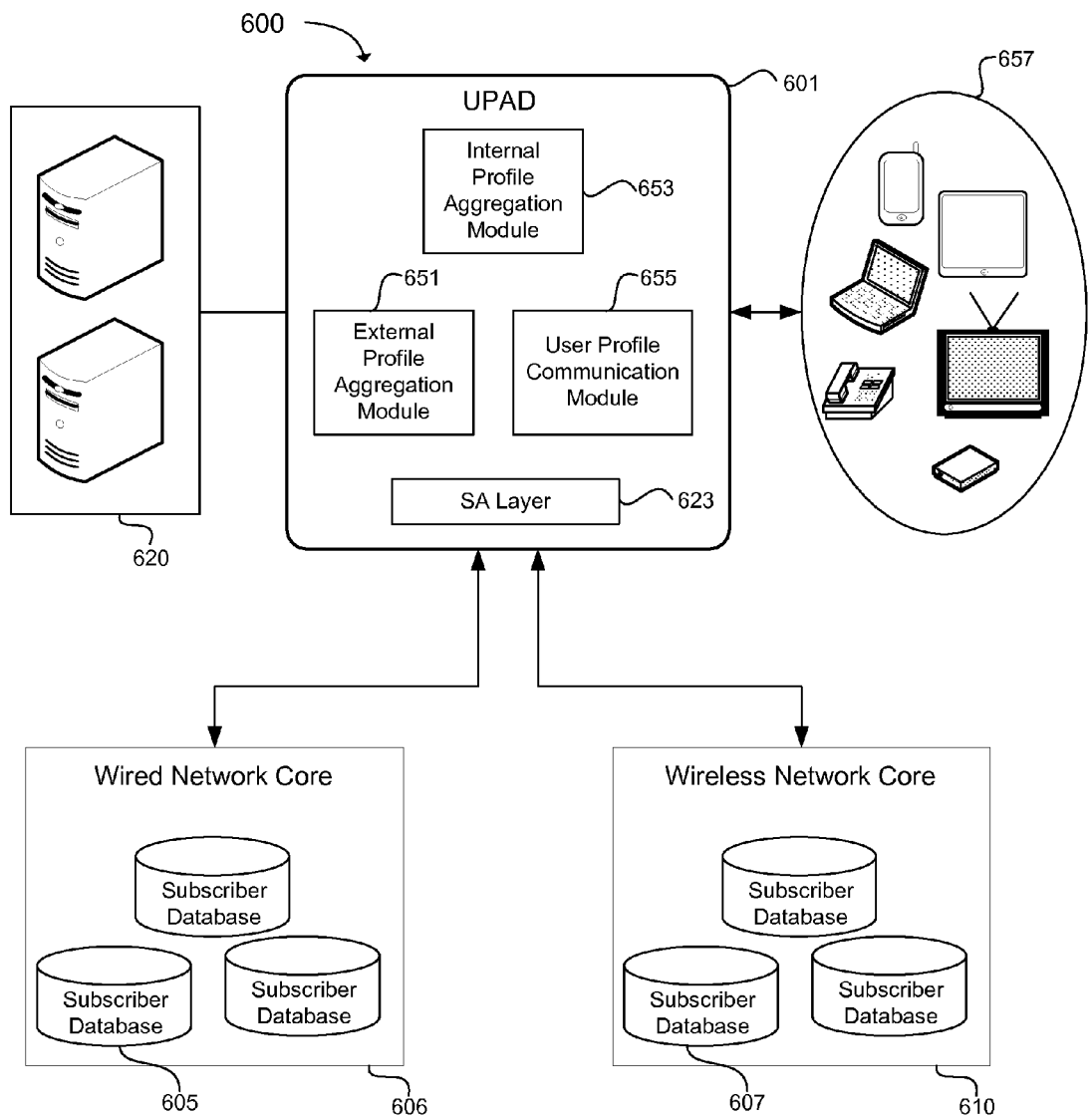
FIG. 6 is a block diagram of an example of the delivery edge aggregation system in accordance with another embodiment of the present invention.

FIG. 6 provides another embodiment of a delivery edge profile aggregation system 600. The system comprises a UPAD 601 configured to interface with at least one subscriber database 605 in a wired network core 606 of a wired service provider and at least one subscriber database 607 in a wireless network core 610 of a wireless service provider. In one embodiment, the MSO may operate both the wired and wireless network cores. Alternatively, the MSO may contract with service providers to operate the wired and wireless network cores.

The delivery edge profile aggregation system 600 can also include an external profile aggregation module 651 is configured to aggregate profile information at the UPAD 601 regarding the subscriber. The profile information is aggregated from the subscriber databases at the wired and wireless network cores. A subscriber database at a network core is any database used in conjunction with the network core. Thus, a subscriber database 607 at the wireless network core 610 is a database used by the wireless services provider. Similarly, a subscriber database 605 at the wired network core 606 is a database used by the wired services provider. Examples of typical databases, such as the AAA and PCRF databases, have been previously discussed.

The external profile aggregation module 651 can also be configured to interface with web service application servers 620. The web service application servers are configured to operate applications such as home demographic profiling service applications, economic profile profiling service applications, and service availability service applications. The information from these applications can be sent to the external profile aggregation module. The information can be aggregated as desired.

In one embodiment, the UPAD 601 can be configured to communicate with the subscriber databases through a services abstraction layer 623. The services abstraction layer is a software layer that may be resident on the UPAD and enables the UPAD to communicate with the subscriber databases in both the wired and wireless networks.

The services abstraction layer 623 may also be used to pass information obtained from a subscriber database in one network to a subscriber database in another network. For instance, settings for viewing television that are setup in the wired network may be passed by the UPAD 601 to the wireless network to allow the same settings to take effect for a subscriber's wireless devices. Similarly, telephony settings setup in the wired network may be passed to the wireless network. For instance, the information may need to be reformatted by the UPAD if the databases in the different networks have different standards.

The delivery edge aggregation system 600 can further comprise an internal profile aggregation module 653 that is configured to aggregate consumption information at the UPAD 601 about the subscriber regarding the subscriber's consumption of wired and wireless services provided by the MSO. In one embodiment, the UPAD may be in direct wired or wireless communication with the subscriber's devices 657 that receive services from the MSO. Information regarding the subscriber's consumption of wired and wireless services can be obtained via the direct wired or wireless connection. The consumption information can be aggregated at the UPAD with the profile information that was obtained from the subscriber databases at the wired and wireless network cores.

In another embodiment, the UPAD 601 can enable changes to the permissions of one device connected to the wired core 606 to be made to a corresponding device connected to the wireless core 610, and vice versa. For instance, as discussed above, a change in a television package for a cable television in communication with the wired core can be noted at the UPAD. The UPAD can communicate this change in permission to the wireless core to enable any television services the subscriber may have with wireless devices to be similarly adjusted.

The UPAD can also include a user profile communication module 655 configured to transmit the subscriber's aggregated profile information and aggregated consumption information from the UPAD to the MSO. The information may be transmitted to a database 605 at the wired network core 606 or a database 607 at the wireless network core 610. Alternatively, the aggregated information may be transmitted to additional locations such as the web services server 620 or another server operated by the MSO.

Figure 7:
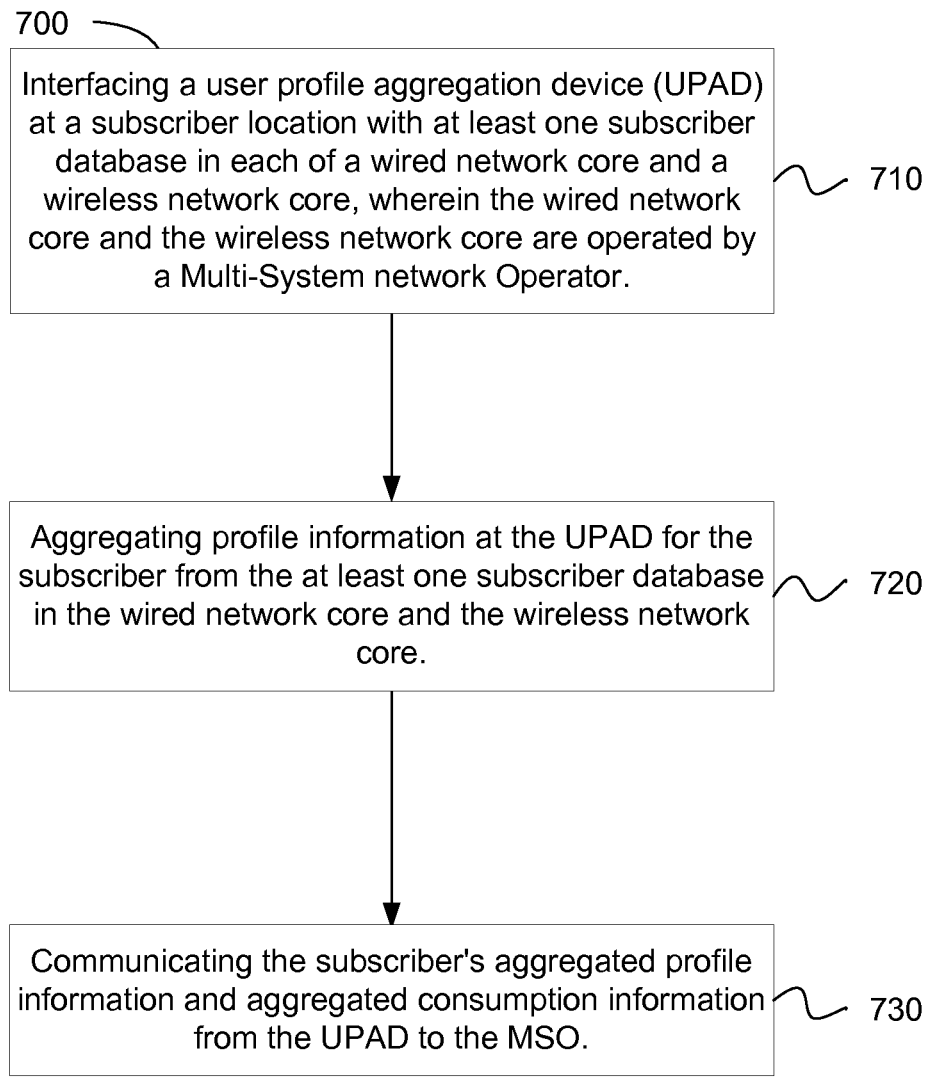
FIG. 7 depicts a flow chart of a method for aggregating subscriber information at a delivery edge in accordance with an embodiment of the present invention.

In another embodiment, a method 700 for aggregating subscriber information at a delivery edge is disclosed, as depicted in the flow chart of FIG. 7. The method comprises interfacing a user profile aggregation device (UPAD) at a subscriber location with at least one subscriber database in each of a wired network core and a wireless network core. The wired network core and the wireless network core are operated by a Multi-System network Operator (MSO). In one embodiment, the wired and wireless network core may be owned by the MSO. Alternatively, the MSO may lease the network cores from other entities or pay other entities a royalty to allow the MSO's subscribers access to their network cores.

The method 700 further comprises aggregating 730 profile information at the UPAD for the subscriber from the at least one subscriber database in the wired network core and the wireless network core. Consumption information can also be aggregated at the UPAD based on the subscriber's consumption of the wired, wireless, and networking services provided by the MSO. The subscriber's aggregated profile information and aggregated consumption information can be communicated 740 from the UPAD to the MSO.

It should be understood that many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

Various techniques, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as defacto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of materials, fasteners, sizes, lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A delivery edge profile aggregation system, comprising:
a user profile aggregation device (UPAD) for a subscriber that is located at a delivery edge at a subscriber location and configured to interface with at least one subscriber database in a wired network core of a wired service provider and at least one subscriber database in a wireless network core of a wireless service provider, wherein the wired service provider and the wireless service provider are affiliated with a Multi-System network Operator (MSO);
wherein the delivery edge is where each service of the wired and wireless service providers affiliated with the MSO is received;
wherein the at least one subscriber database in the wired network core and the at least one subscriber database in the wireless network core are non-interoperable;
an external profile aggregation module that is part of the UPAD and is configured to aggregate profile information at the UPAD regarding the subscriber from the non-interoperable subscriber databases at the wired and wireless network cores; and
an internal profile aggregation module that is part of the UPAD and is configured to aggregate consumption information at the UPAD about the subscriber regarding the subscriber's consumption of wired and wireless services provided by a Multi-System network Operator (MSO); and
a subscriber profile communication module that is part of the UPAD and is configured to communicate the subscriber's aggregated profile information from the UPAD to the MSO.

2. The system of claim 1, wherein the subscriber profile communication module is further configured to communicate the subscriber's aggregate consumption information from the UPAD to the MSO.

3. The system of claim 1, wherein the UPAD is configured to receive services from at least one of the wireless service provider and the wired service provider.

4. The system of claim 1, wherein the UPAD further comprises a services abstraction layer configured to communicate with the subscriber databases in the wired network core and the wireless network core.

5. The system of claim 1, wherein the UPAD further comprises a services abstraction layer configured to enable the UPAD to transfer information from the wired network core to the wireless network core.

6. The system of claim 1, wherein the UPAD further comprises a services abstraction layer configured to enable the UPAD to transfer information from the wireless network core to the wired network core.

7. A method for aggregating subscriber information at a delivery edge using at least one processor device, comprising:
interfacing a user profile aggregation device (UPAD) at a deliver edge at a subscriber location with at least one subscriber database in each of a wired network core and a wireless network core, wherein the wired network core and the wireless network core are operated by a Multi-System network Operator (MSO);
wherein the delivery edge is where each service of the wired and wireless service providers affiliated with the MSO is received;
wherein the at least one subscriber database in each of a wired network core and a wireless network core are non-interoperable;
aggregating profile information at the UPAD for the subscriber from the at least one non-interoperable subscriber database in the wired network core and the wireless network core; and
communicating the subscriber's aggregated profile information and aggregated consumption information from the UPAD to the MSO.

8. The method of claim 7, further comprising aggregating consumption information at the UPAD about the subscriber based on the subscriber's consumption of wired, wireless, and networking services provided by the MSO.

9. The method of claim 8, further comprising aggregating the profile information and the consumption information from a plurality of subscribers to form aggregate subscriber collections.

10. The method of claim 9, further comprising data mining the aggregate subscriber collections to generate predictive models of a subscriber's behavior.

11. The method of claim 10, further comprising offering a selected subscriber customized services from the MSO based on a comparison of the selected subscriber's aggregated profile information and aggregated consumption information with the predictive models.

12. The method of claim 7, further comprising using the UPAD to enable changes that are made to a permission of a device connected to the wired network core to be made to a corresponding device connected to the wireless network core.

13. The method of claim 7, further comprising interfacing the UPAD with the at least one subscriber database in each of a wired network core and a wireless network core through a services abstraction layer.

14. A computer program product, comprising a non-transitory computer usable medium having a computer readable program code embodied therein, said computer readable program code, that when executed by a processor device, cause a system to implement a method for aggregating subscriber information at a delivery edge comprising:
aggregating profile information for a subscriber at a user profile aggregation device (UPAD) that is located at a deliver edge at a subscriber location, wherein the UPAD is interfaced with at least one subscriber database in each of a wired network core and a wireless network core, wherein the wired network core and the wireless network core are operated by a Multi-System network Operator (MSO);
wherein the delivery edge is where each service of the wired and wireless service providers affiliated with the MSO is received;
wherein the at least one subscriber database in each of a wired network core and a wireless network core are non-interoperable;
aggregating consumption information at the UPAD about the subscriber based on the subscriber's consumption of the non-interoperable wired, wireless, and networking services provided by the MSO; and
communicating the subscriber's aggregated profile information and aggregated consumption information from the UPAD to the MSO.

15. The method of claim 14, further comprising computer readable program code that, when executed by the processor device, cause a system to aggregate the profile information and the consumption information from a plurality of subscribers to form aggregate subscriber collections.

16. The method of claim 15, further comprising computer readable program code that, when executed by the processor device, cause a system to data mine the aggregate subscriber collections to generate predictive models of a subscriber's behavior.

17. The method of claim 16, further comprising computer readable program code that, when executed by the processor device, cause a system to offer a selected subscriber customized services from the MSO based on a comparison of the selected subscriber's aggregated profile information and aggregated consumption information with the predictive models.

18. The method of claim 14, further comprising computer readable program code that, when executed by the processor device, cause a system to use the UPAD to enable changes that are made to a permission of a device connected to the wired network core to be made to a corresponding device connected to the wireless network core.

19. The method of claim 14, further comprising computer readable program code that, when executed by the processor device, cause a system to use the UPAD to enable changes that are made to a permission of a device connected to the wireless network core to be made to a corresponding device connected to the wired network core.

20. The method of claim 14, further comprising computer readable program code that, when executed by the processor device, cause a system to interface the UPAD with the at least one subscriber database in each of the wired network core and the wireless network core through a services abstraction layer.

\* \* \* \* \*